(12) United States Patent
Lu et al.

(10) Patent No.: US 6,701,045 B2
(45) Date of Patent: Mar. 2, 2004

(54) PLANAR OPTICAL WAVEGUIDE DENSE WAVELENGTH DIVISION MULTIPLEXER

(75) Inventors: Ying-Tsung Lu, Hsinchu (TW); Eric G. Lean, Hsinchu (TW); Ching-Chin Wu, Taichung (TW)

(73) Assignee: Industrial Technology Research Institute (TW)

( * ) Notice: Subject to any disclaimer, the term of this patent is extended or adjusted under 35 U.S.C. 154(b) by 193 days.

(21) Appl. No.: 09/941,729

(22) Filed: Aug. 30, 2001

(65) Prior Publication Data

US 2002/0186925 A1 Dec. 12, 2002

(30) Foreign Application Priority Data

Jun. 7, 2001 (TW) ........................................ 90113769 A

(51) Int. Cl.[7] ................................................. G02B 6/34
(52) U.S. Cl. ...................................................... 385/37
(58) Field of Search .............................. 385/37, 33, 18, 385/39, 24; 359/127, 131, 129, 130, 133, 115, 587

(56) References Cited

U.S. PATENT DOCUMENTS

| | | | |
|---|---|---|---|
| 4,387,955 A | | 6/1983 | Ludman et al. |
| 4,479,697 A | * | 10/1984 | Kapany et al. ............... 385/33 |
| 4,736,360 A | | 4/1988 | McMahon |
| 4,784,935 A | | 11/1988 | Ehrfeld et al. |
| 5,296,882 A | * | 3/1994 | Nelson et al. ............... 353/63 |
| 5,583,683 A | * | 12/1996 | Acobey ...................... 359/127 |
| 5,808,763 A | * | 9/1998 | Duck et al. ................ 359/127 |

* cited by examiner

Primary Examiner—Jean F. Duverne
(74) Attorney, Agent, or Firm—Birch, Stewart, Kolasch & Birch, LLP

(57) ABSTRACT

This specification discloses a planar optical waveguide DWDM (Dense Wavelength Division Multiplexer), which is an integrated DWDM made by using the planar optical waveguide manufacturing technology. A diffractive grating is used in a planar optical path to direct beams of different wavelengths in a beam into different directions. An arrayed waveguide installed at the output end of the planar optical path couples the beams of different wavelengths to an optical fiber connected at the output end, separating the waves. On the other hand, a preferred embodiment of the invention has an arrayed lens between the diffractive grating and the arrayed waveguide. The arrayed lens can correct the deviated diffractive beams due to thermal deformation of the diffractive grating and conduct them into the arrayed waveguide.

11 Claims, 10 Drawing Sheets

PLANAR OPTICAL WAVEGUIDE DENSE WAVELENGTH DIVISION MULTIPLEXER

BACKGROUND OF THE INVENTION

1. Field of Invention

The invention relates to a DWDM (Dense Wavelength Division Multiplexer) and, in particular, to an integrated DWDM made by using the planar waveguide manufacturing technology for processing a wide-band beam with multiple wavelengths and correcting thermal deformation.

2. Related Art

The known devices for the DWDM include: OTFF's (Optical Thin Film Filter), AWG's (Arrayed Waveguide Grating), fiber gratings, etc. However, 1. The OTFF has a small dependence on the temperature. But the manufacturing process is difficult and there are few channels.

2. The AWG has the strongest dependence on the temperature. The manufacturing process is difficult and there are more channels.

3. The fiber grating has a strong dependence on the temperature. The manufacturing process is difficult and there are few channels.

Although there are many other technologies being disclosed, such as the U.S. Pat. Nos. 4,784,935, 4,387,955, and 4,736,360, the optical device structures disclosed in these patents do not use the planar waveguide manufacturing technology. Therefore, the sizes of the devices are large. Even though they all have a grating, the problem of displacement in diffractive beams due to thermal deformation on the grating is still unsolved.

SUMMARY OF THE INVENTION

An objective of the invention is to provide a planar optical waveguide DWDM that has a simpler, cost-effective manufacturing process for mass production and can solve the problem of few chancels.

Another objective of the invention provides a planar optical waveguide DWDM with little dependence on the temperature.

Using the planar waveguide manufacturing technology, a grating is mounted in a planar optical path. Using beam dispersion property due to surface relief, beams with different wavelengths are diffracted into different directions, producing the spatially wavelength division phenomenon. The wide-band input beam is then divided into many narrow-band beams, which are then directed through a planar optical path into an arrayed waveguide. The beams are coupled to an optical fiber connected to the output end of the arrayed waveguide.

Since the invention uses a dense double grating and a curved surface reflector, the input beam after wavelength division can be properly focused at small bright spots. After being guided into the arrayed waveguide, the beams are connected to respective output optical fibers. As the focused bright spots of different wavelengths are spatially apart from one another, they do not interfere. Therefore, the invention has dense, multi-channel wavelength division ability. With the planar waveguide manufacturing technology, an integrated DWDM can be obtained.

An arrayed lens is further inserted on the optical path between the diffractive grating and the arrayed waveguide so that when the grating causes diffractive beam displacements from thermal deformation, the displaced beams can be corrected back to correct paths. Thus, the invention can solve the misalignment problem due to temperature variations.

BRIEF DESCRIPTION OF THE DRAWINGS

The present invention will become more fully understood from the detailed description given hereinbelow illustration only, and thus are not limitative of the present invention, and wherein:

FIG. 5 is the plan view of another embodiment, where a polarization-unifying device is added in;

DETAILED DESCRIPTION OF THE INVENTION

Figure 1:
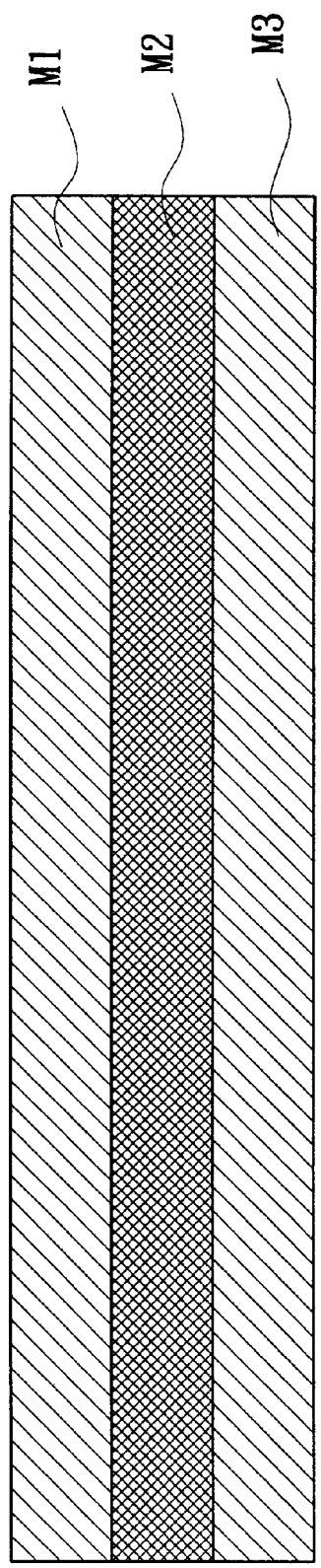
FIG. 1 is a cross-sectional view of the invention.

With reference to FIG. 1, the planar optical waveguide device manufactured using the planar optical waveguide technology is an optical device made of three layers M1, M2, and M3. The refractive index of the layers M1, M2, and M3 are n1, n2, and n3, respectively, where n2>n1, n3. Owing to total reflection, when a beam is guided into the middle layer of optical material M2, it is confined to propagate within the planar optical path formed by the optical material M2. The present invention utilizes this type of planar optical waveguide device as the basis. Semiconductor manufacturing technologies are employed for the planar optical path in the middle layer of optical material M2 to design a thin, light and small integrated DWDM (Dense Wavelength Division Multiplexer).

Figure 2:
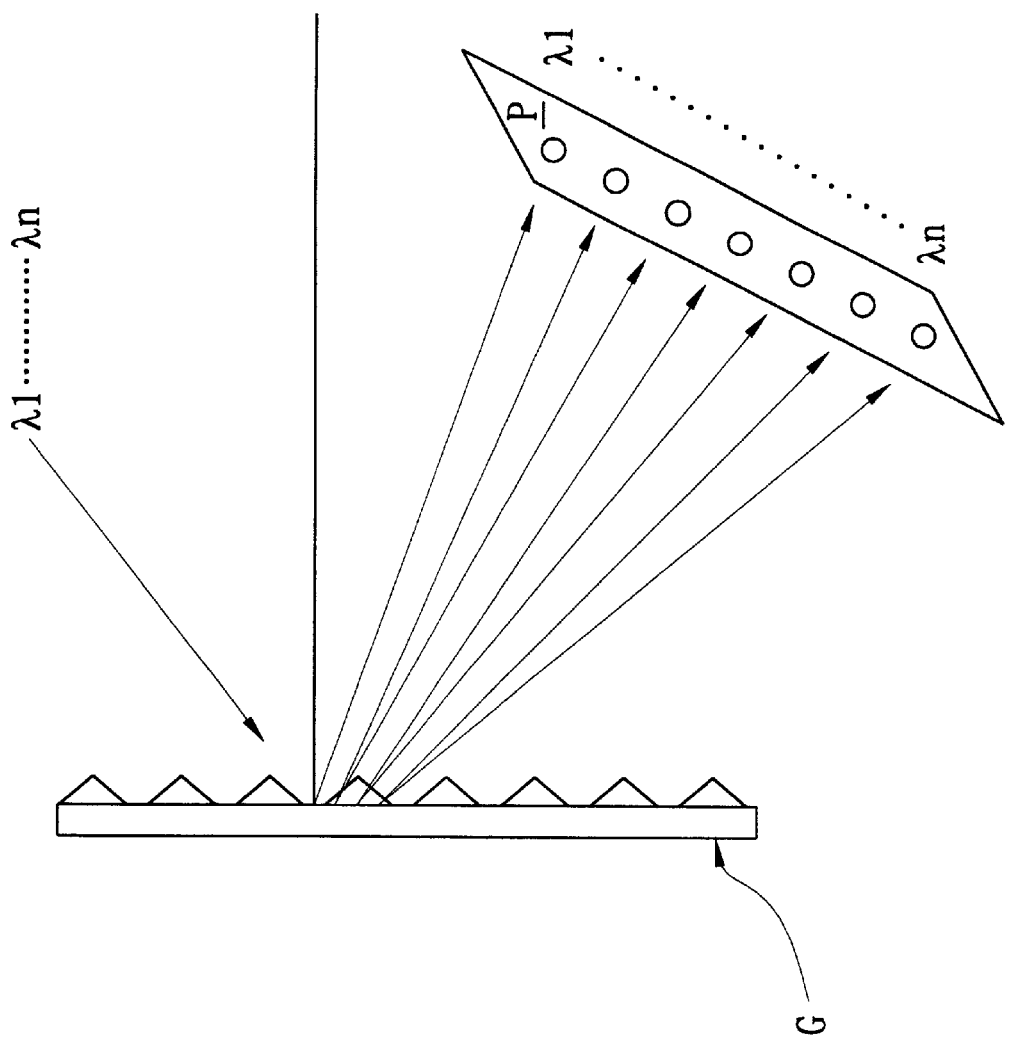
FIGS. 2 and 3 describes how the grating of the invention diffracts light beams.
Figure 3:
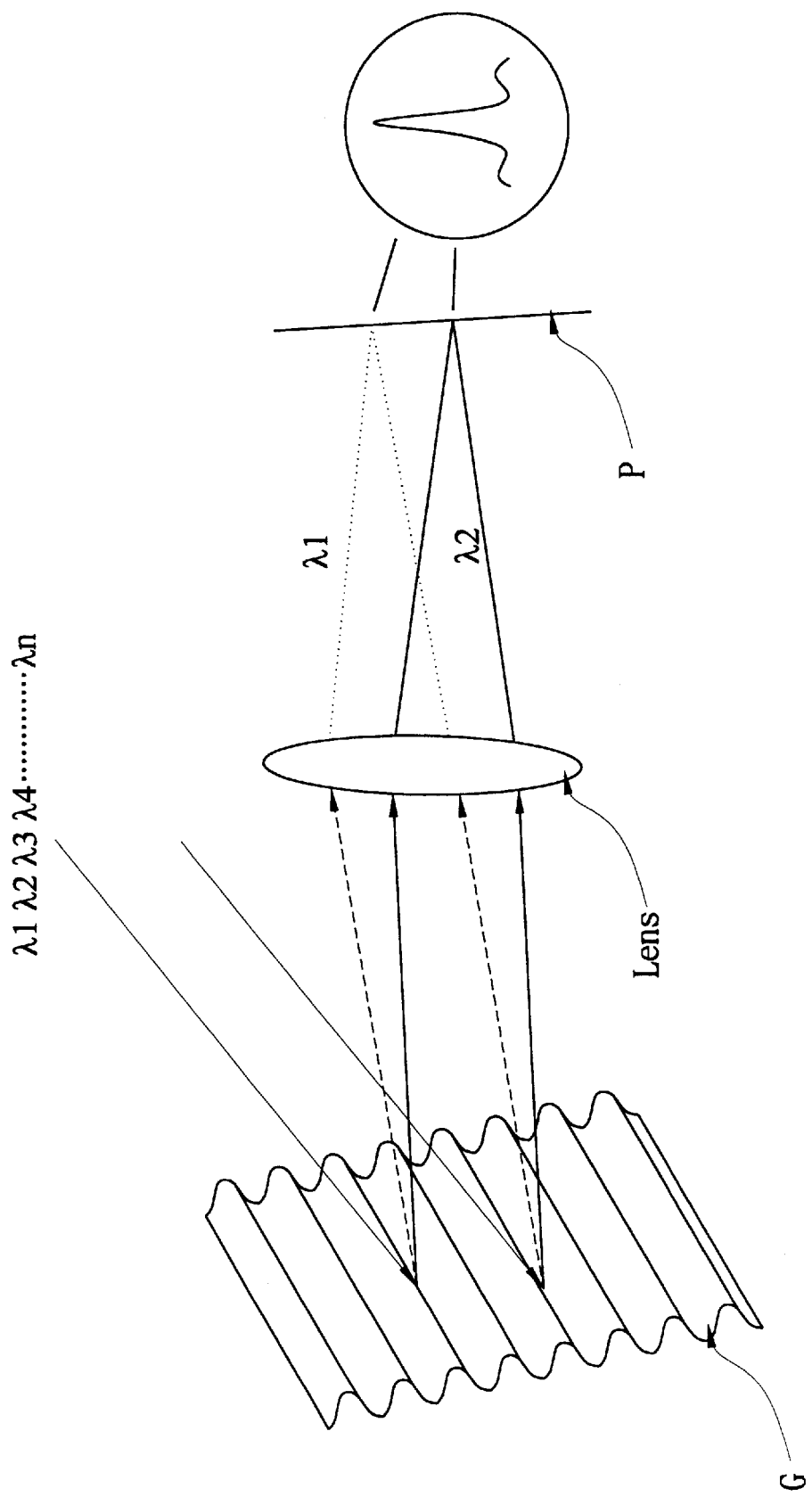

The main technical means used in the invention is to utilize the dispersion caused by a grating G (FIG. 2) to separate beams of different wavelengths in an incident laser beam. They are spatially separated so that beams of different wavelengths ($\lambda_1 \sim \lambda_n$) can be individually modulated. If the incident laser beam is processed into linearly polarized beams (TE) running in parallel, through the diffraction of the grating G, a lens is then used to converge them. Bright spots with a Bessel strength distribution appear at the focal plane of the lens (FIG. 3). Consequently, separated beams form a series of bright spots on the focal plane P (FIG. 2), thus separating the wavelengths.

Figure 4:
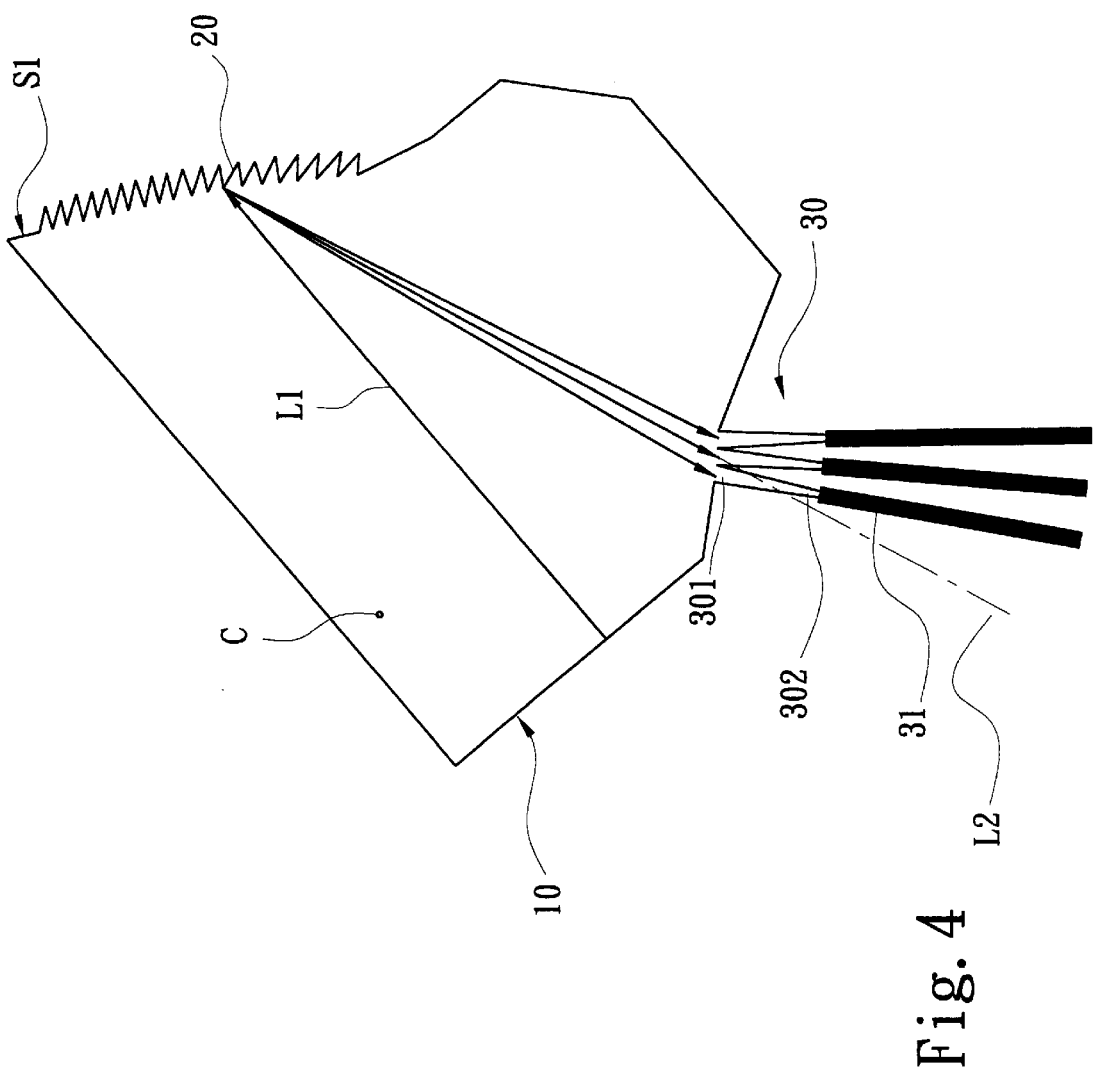
FIG. 4 is a plan view of the disclosed structure, which shows each optical device on the planar optical path composed of the middle layer of optical material using the semiconductor manufacturing technology.

As shown in FIG. 4, the optical devices on the planar optical path formed by the middle layer of optical material M2 using the semiconductor manufacturing technology includes: an input port 10, a curved grating 20, and an arrayed waveguide 30. A wide-band input beam with different wavelengths is guided through the input port 10 into the DWDM and propagates along a first optical path L1. The curved grating 20 is set at the end of the first optical path L1 to converge the input beam into a bright spot array and to produce color dispersion. Beams of different wavelengths are diffracted into different directions so as to propagate along second optical paths symmetric about L2. The arrayed waveguide has several beam input ports 301, several beam output ports 302 connected with them, and several optical fibers 31 connected to the beam output ports 302. The beam input ports 301 are at the end of the second optical paths L2 and in alignment with the diffractive beams from the curved grating 20. The beam input ports 301 guide each of the diffractive beams to the beam output ports 302. The optical fibers 31 then send the beams out of the planar waveguide DWDM.

The surface relief pattern of the curved grating 20 is on the surface S1 of the middle layer of optical material M2 that is opposite to the input port 10. Thus, gold is coated on the outer side of the curved grating 20 to diffract the incident beam. In addition to producing color dispersion for the incident beam, the curved grating 20 can further diffract beams of different wavelengths into different directions. The surface S1 is curved with the center of curvature C being near the input port 10. Using such a design of the curved grating 20, determination of the curvature at the same time decides the convergent power of the lens in FIG. 3.

In general, each beam output from the DWDM is guided out by the optical fibers 31 at the output end of the DWDM. These optical fibers 31 are arranged side by side. As the sizes of currently available optical fibers 31 are larger, any adjacent optical fibers are separated by roughly 150 $\mu$m. For a DWDM manufactured in the traditional non-planar waveguide method, the size and volume increase with the number of output channels. To gauge the DWDM volume within normal optical device size limitations, the number of output channels will be limited, rendering the goal of increasing channel density almost impossible.

Accordingly, the disclosed arrayed waveguide 30 is made using semiconductor manufacturing processes (such as mask etching) so as to readily increase the channel density. For example, through the means of increasing the density of and/or compactifying the beam input ports 301, the distance between any adjacent beam input ports 301 can be lowered down to 20~30 $\mu$m and the beam input ports 301 are still in alignment with the diffractive beams from the curved grating 20. The beam output ports 302 of the arrayed waveguide 30 are radially distributed just for the connections with the optical fibers 31. This method therefore increases the channel density.

On the other hand, since the arrayed waveguide 30 and the curved grating 20 are in the same layer of optical material M2 and manufactured using semiconductor processes, the alignment of optical axes can also achieve the required accuracy.

Figure 5:
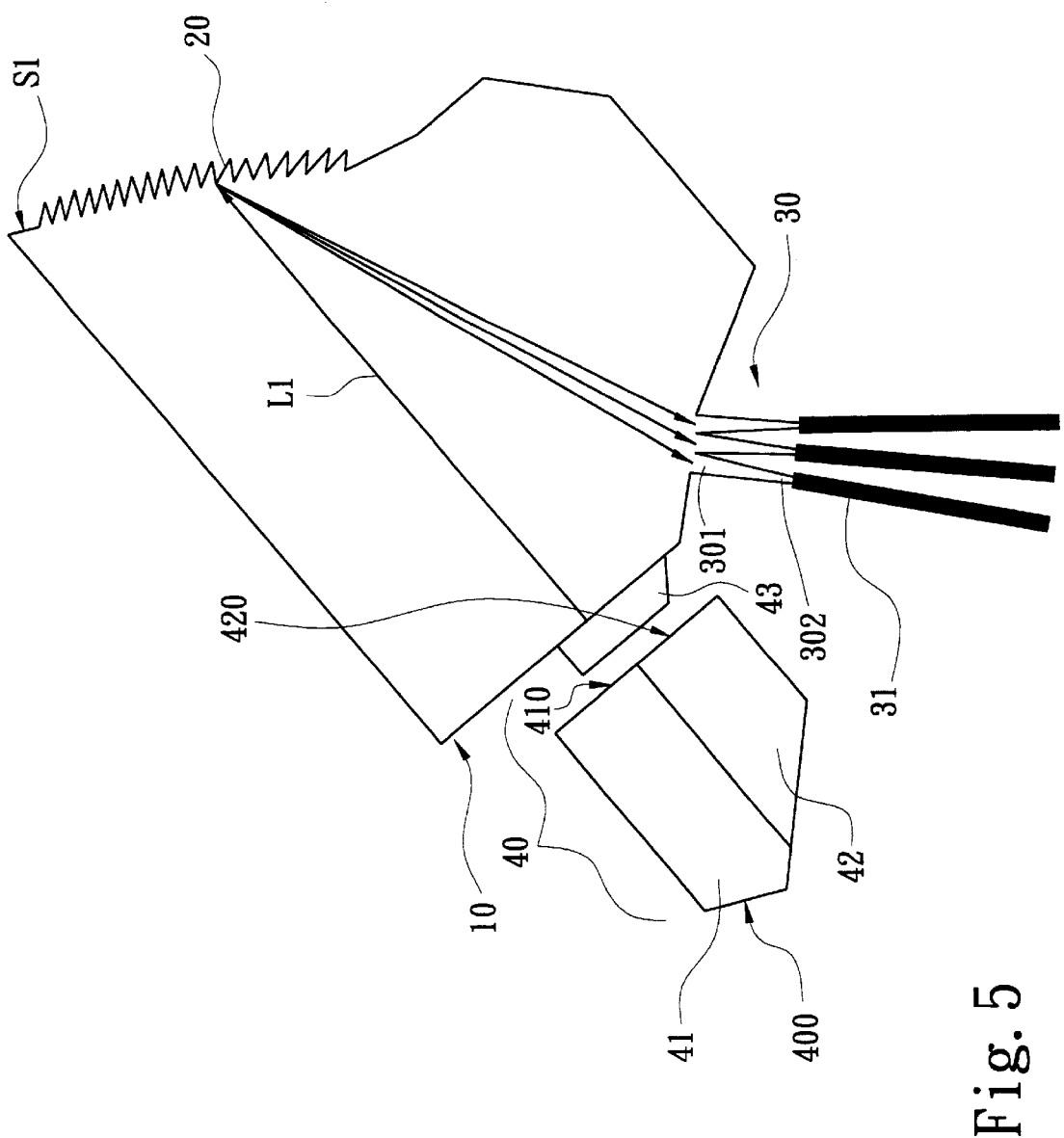

The incident beam entering the input port 10 is usually a laser beam polarized in any direction. It has to be processed into linearly polarized beams (TE) running in parallel so that an optimal diffractive efficiency of the curved grating 20 and an increased photon flux can be obtained. Thus, in another embodiment of the invention, a polarization-unifying device 40 is installed before the input port 10 (FIG. 5) to process incident beams with arbitrary polarizations into linearly polarized beams (TE) running in parallel.

Figure 6:
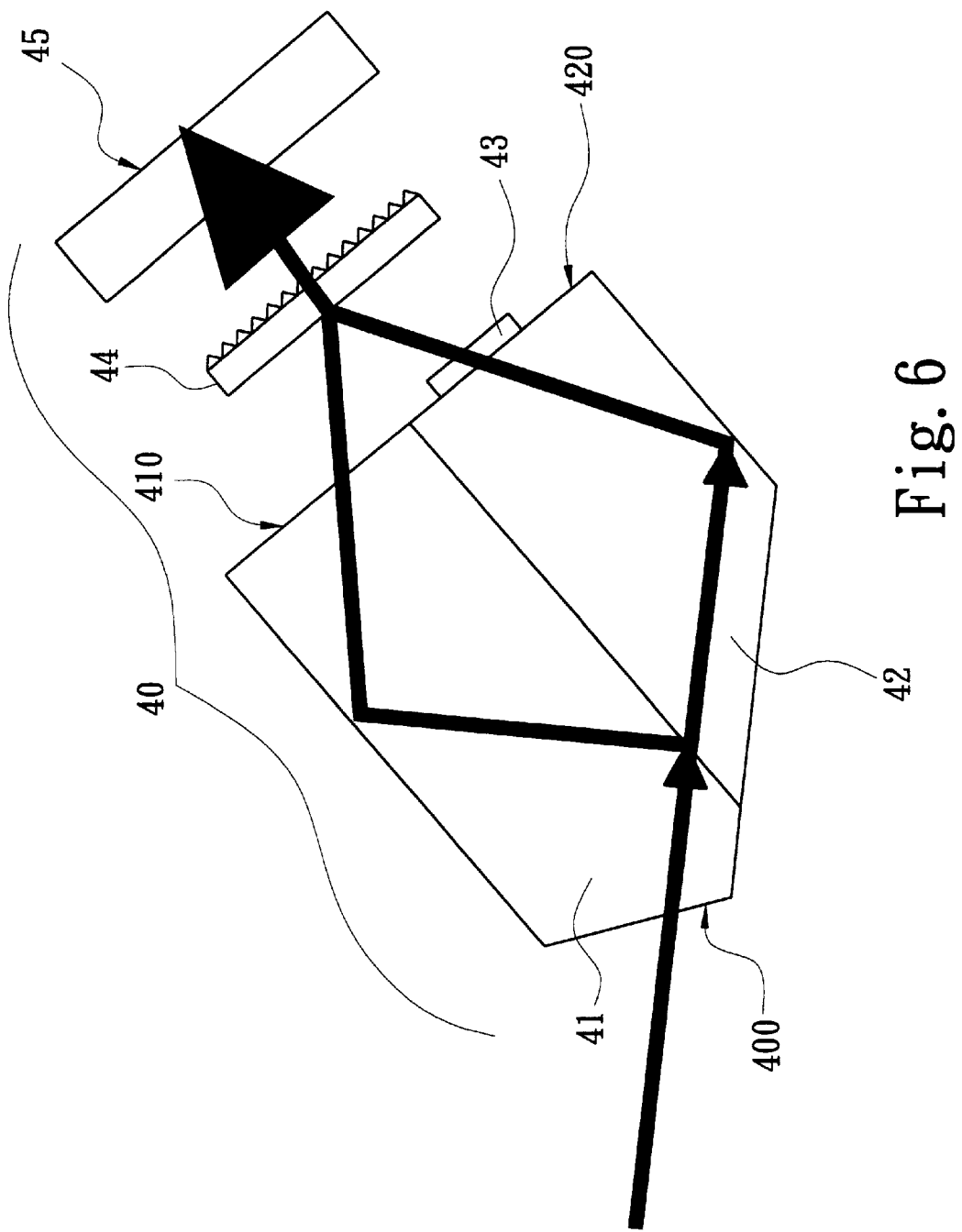
FIG. 6 shows how the polarization-unifying device works, where the optical paths of a wide-band input beam are illustrated.

The polarization-unifying device 40 includes: two optical crystals (a first crystal 41 and a second crystal 42) connected with each other at one surface, a beam-combining grating 44, and a cylindrical lens 45. The polarization optical axes of the crystals 41, 42 are orthogonal. Suppose the optical axis of the first crystal 41 is S (Sigma) and that of the second crystal 42 is P (Parallel). When a wide-band incident beam with many different wavelengths enters an incident surface 400 of the polarization-unifying device 40 (FIG. 6), the beam with the S polarization is limited to propagate within the first crystal 41 due to total reflection and output through a first output surface 410. The beam with the P polarization penetrates through the first crystal 41 and enters the second crystal 42. It is then trapped and propagates within the second crystal 42 and comes out of a second output surface 420. A half-wave plate (½λ plate) 43 is provided at the second output surface 420 to turn the polarization of the P polarized beam by 90 degrees. The beams from the first output surface 410 and the second output surface 420 become linearly polarized beams running in parallel.

Figure 7:
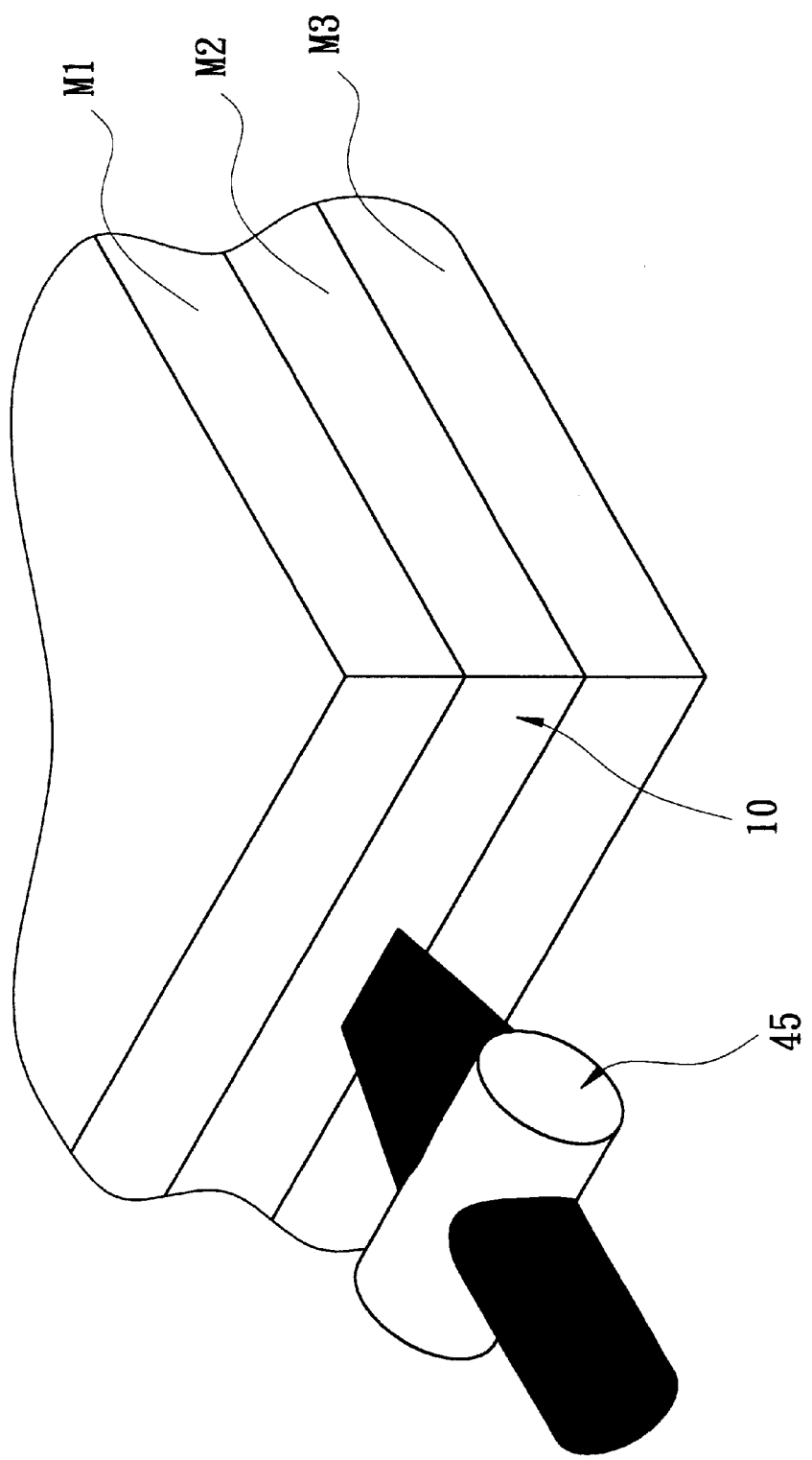
FIG. 7 shows the local structure of the polarization-unifying device, where a cylindrical lens converges a straight laser beam into a line-shape beam.

The beam-combining grating 44 integrated the linearly polarized beams output from the first output surface 410 and the second output surface 420 into a straight laser beam. The cylindrical lens 45 converges the straight laser beam integrated by the beam-combining grating 44 into a line-shape beam (FIG. 7) and outputs it to the input port 10 of the planar waveguide DWDM.

Figure 8:
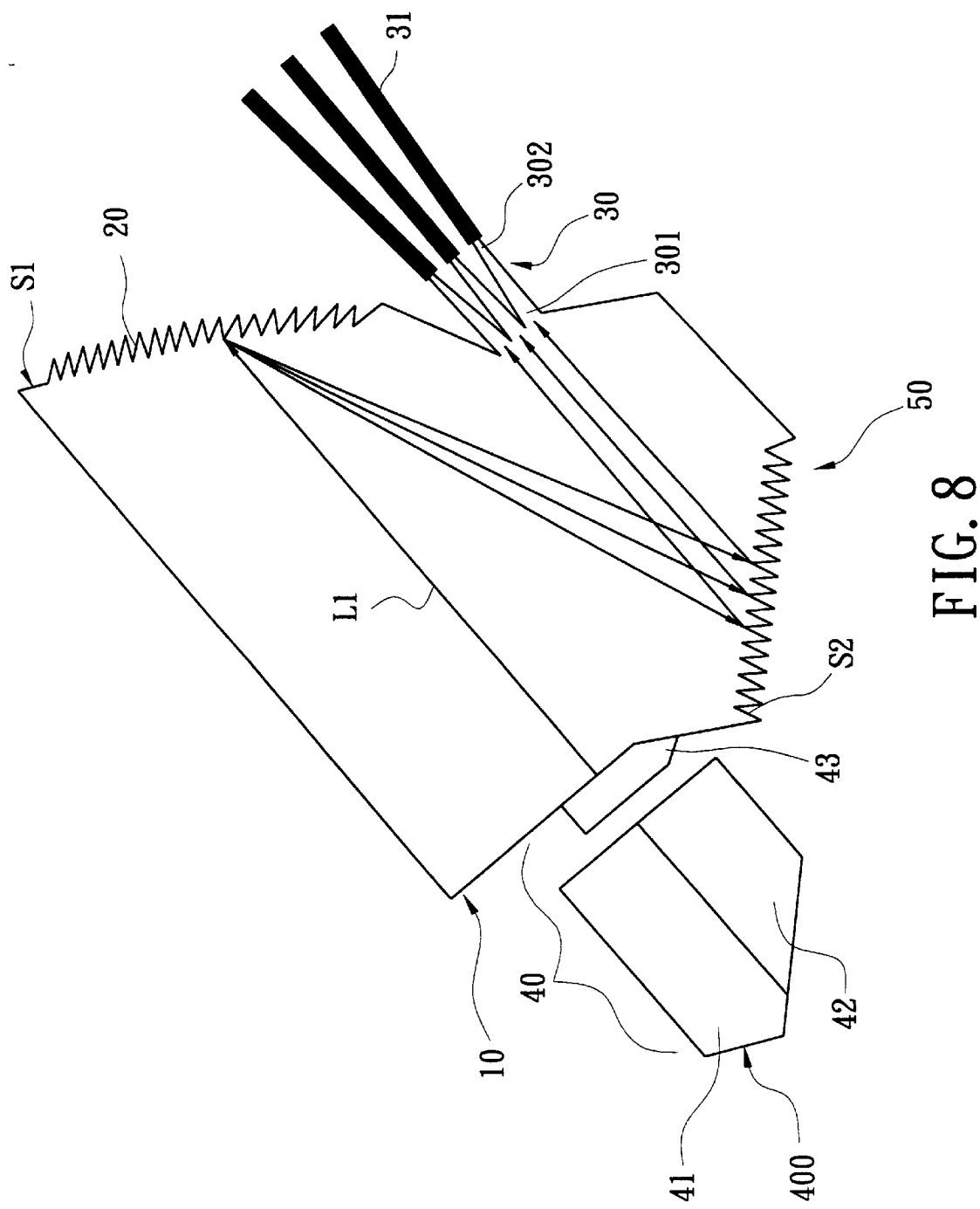
FIG. 8 is the plan view of another embodiment, where a plane grating is added into the structure in FIG. 4.

Another embodiment of the planar optical waveguide DWDM is shown in FIG. 8. It is based upon the structure in FIG. 4. A planar grating 50 is added into the optical path between the curved grating 20 and the arrayed waveguide 30 to perform additional wavelength division for the beams from the curved grating 20. The intervals among the beams of different wavelengths become larger. As before, the beams are directed to the arrayed waveguide 30 and output to the optical fibers 31. The surface relief pattern on the plane grating 50 is inscribed in the middle layer of optical material M2 on the surface S2 opposite to the curved grating 20. Also due to the diffraction principle, the diffractive beams from the curved grating 20 are diffracted again by the plane grating 50 before they are guided to the arrayed waveguide. These double grating and curved reflector technologies make possible of focusing separated beams at small bright spots. The arrayed waveguide 30 then guide them to each of the optical fibers 31. Since the bright spots are distributed spatially apart, the beams do no interfere with one another. Therefore, the invention has the dense wavelength division ability. With the planar optical waveguide technology, an integrated dense DWDM can be obtained.

Figure 9:
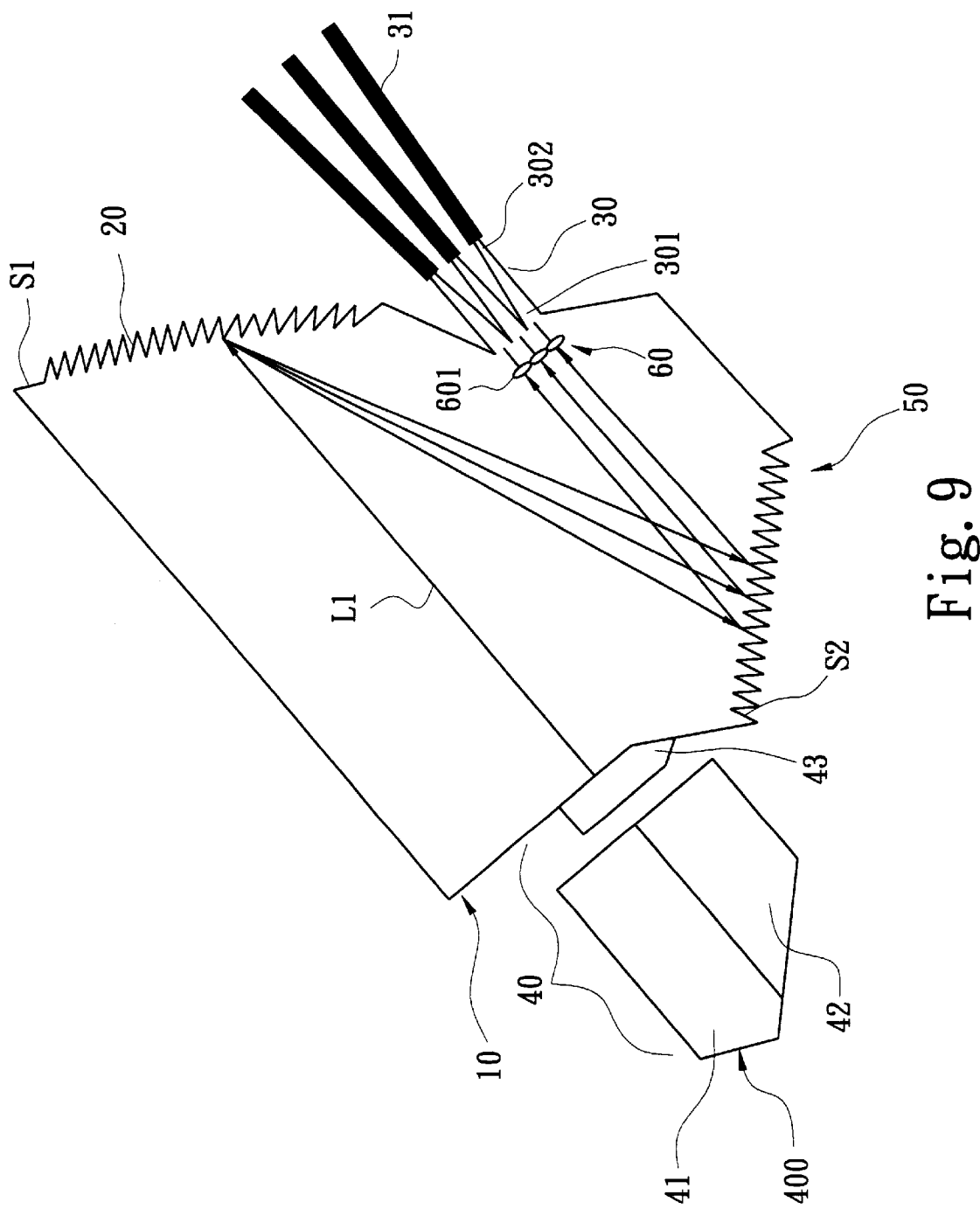
FIG. 9 is the plan view of yet another embodiment, where an arrayed lens is added into the structure in FIG. 8.

With reference to FIG. 9, a further embodiment of the invention is based on the structure in FIG. 8. An arrayed lens is added into the optical path between the plane grating 50 and the arrayed waveguide 30. It can correct deviated diffractive beams due to the thermal deformation of the curved grating 20 and the plane grating 50. Analogously, this arrayed lens 60 can be used in the structure in FIG. 4. There, the arrayed lens 60 is inserted between the curved grating 20 and the arrayed waveguide 30 to correct the deviation due to thermal deformation of the curved grating 20.

Figure 10:
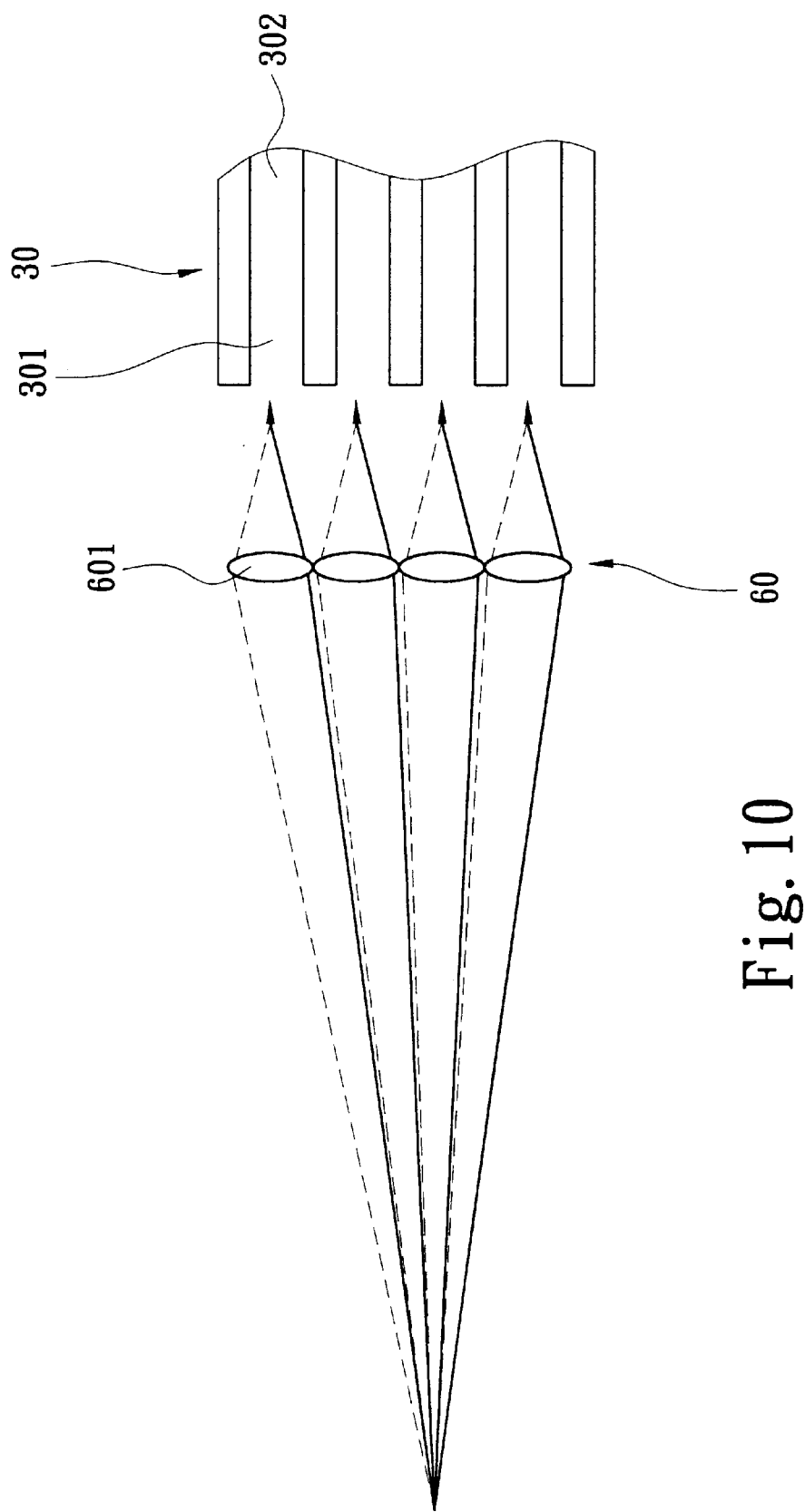
FIG. 10 is a schematic view showing how the arrayed lens function to correct the deviated diffractive beams.

In FIG. 10, the diffractive beams from the curved grating 20 and the plane grating 50 travel along the solid and dashed lines under high and low environmental temperatures, respectively. Each beam is guided to the corresponding lens 601 in the arrayed lens 60 so that all of them can correctly enter each beam input port 301 of the arrayed waveguide 30.

Effects of the Invention

1. The manufacturing process is simple and the channel density can be effectively increased.

2. When the grating causes diffractive beam displacements due to thermal deformation, the invention can corrects the diffractive beams back into correct positions. It can solve the problem of channel misalignment, so it has less environmental temperature dependence.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A planar optical waveguide DWDM (Dense Wavelength Division Multiplexer) to perform wavelength division on a linearly polarized wade-band beam with a plurality of different wavelengths, which comprises the following optical devices formed on a planar optical path through the middle layer of a planar optical waveguide device using semiconductor manufacturing technologies:

an input port, which guides the wade-band beam into the DWDM to travel along a first optical path;

a curved grating, which is at the end of the first optical path to converge the input beam at a bright spot array and to generate color dispersion so that beams of different wavelengths are diffracted to different directions to travel along second optical paths symmetric about a line; and an arrayed waveguide, which has a plurality of beam input ports, a plurality of beam output ports connected to the plurality of beam input ports, and a plurality of optical fibers connected to the plurality of beam output ports, the plurality of beam input ports being at the end of the second optical paths in alignment with the diffractive beams from the curved grating to guide each of the diffractive beams to the corresponding beam output port and the corresponding optical fiber for output;

further comprising a plane grating wherein the surface relief pattern is inscribed on the surface opposite to the curved grating in the middle layer of planar optical path and the plane grating is inserted between the curved grating and the arrayed waveguide to perform further wavelength division on the diffractive beams from the curved grating so as to increase the distance between adjacent beams.

2. The planar optical waveguide DWDM of claim 1, wherein a surface relief pattern of the curved grating is inscribed on the surface opposite to the beam input ports in the middle layer of planar optical path, the surface being a curved surface with its center of curvature close to the side of the input port.

3. The planar optical waveguide DWDM of claim 1, wherein the beam output ports of the arrayed waveguide are disposed at the positions where the optical fibers can be put side by side.

4. The planar optical waveguide DWDM of claim 1 further comprising an arrayed lens, which has a plurality of lenses disposed between the plane grating and the beam input ports to correct deviated diffractive beams due to thermal deformation of the plane grating and the curved grating and to guide them into the beam input ports of the arrayed waveguide.

5. The planar optical waveguide DWDM of claim 1 further comprising an arrayed lens, which has a plurality of lenses disposed between the curved grating and the beam input ports to correct deviated diffractive beams due to thermal deformation of the curved grating and to guide them into the beam input ports of the arrayed waveguide.

6. A planar optical waveguide DWDM (Dense Wavelength Division Multiplexer) to perform wavelength division on a linearly polarized wide-band beam with a plurality of different wavelengths, which comprises the following optical devices formed on a planar optical path through the middle layer of a planar optical waveguide device using semiconductor manufacturing technologies:

an input port, which guides the wide-band beam into the DWDM to travel along a first optical path;

a curved grating, which is at the end of the first optical path to converge the input beam at a bright spot array and to generate color dispersion so that beams of different wavelengths are diffracted to different directions to travel along second optical paths symmetric about a line; and an arrayed waveguide, which has a plurality of beam input ports, a plurality of beam output ports connected to the plurality of beam input ports, and a plurality of optical fibers connected to the plurality of beam output ports, the plurality of beam input ports being at the end of the second optical paths in alignment with the diffractive beams from the curved grating to guide each of the diffractive beams to the corresponding beam output port and the corresponding optical fiber for output; and a polarization-unifying device, which includes:

a first crystal and a second crystal connected with each other on one surface, the polarization axes of the first and second crystals being orthogonal to process the input wade-band beam into linearly polarized beams in parallel;

a beam-combining grating, which integrates the linearly polarized beams in parallel into a straight laser beam; and a cylindrical lens, which converges the straight laser beam integrated by the beam-combining grating into a line-shape beam and then outputs it to the input port.

7. The planar optical waveguide DWDM of claim 6, wherein a surface relief pattern of the curved grating is inscribed on the surface opposite to the beam input ports in the middle layer of planar optical path, the surface being a curved surface with its center of curvature close to the side of the input port.

8. The planar optical waveguide DWDM of claim 6, wherein the beam output ports of the arrayed waveguide are disposed at the positions where the optical fibers can be put side by side.

9. The planar optical waveguide DWDM of claim 6 further comprising a plane grating, wherein the surface relief pattern is inscribed on the surface opposite to the curved grating in the middle layer of planar optical path and the plane grating is inserted between the curved grating and the arrayed waveguide to perform further wavelength division on the diffractive beams from the curved grating so as to increase the distance between adjacent beams.

10. The planar optical waveguide DWDM of claim 9 further comprising an arrayed lens, which has a plurality of lenses disposed between the plane grating and the beam input ports to correct deviated diffractive beams due to thermal deformation of the plane grating and the curved grating and to guide them into the beam input ports of the arrayed waveguide.

11. The planar optical waveguide DWDM of claim 6 further comprising an arrayed lens, which has a plurality of lenses disposed between the curved grating and the beam input ports to correct deviated diffractive beams due to thermal deformation of the curved grating and to guide them into the beam input ports of the arrayed waveguide.

* * * * *